(12) United States Patent
Ramachandran et al.

(10) Patent No.: US 11,055,706 B2
(45) Date of Patent: Jul. 6, 2021

(54) ENCRYPTED AGGREGATED TRANSACTION DATA EXCHANGE WITH TRANSACTION DATA PROVIDER

(71) Applicant: Google LLC, Mountain View, CA (US)

(72) Inventors: Vinod Kumar Ramachandran, Sunnyvale, CA (US); Shobhit Saxena, Sunnyvale, CA (US); David Owen Shanahan, Sunnyvale, CA (US); Marcel M. M. Yung, New York, NY (US); Sarvar Patel, Montville, NJ (US)

(73) Assignee: Google LLC, Mountain View, CA (US)

( * ) Notice: Subject to any disclaimer, the term of this patent is extended or adjusted under 35 U.S.C. 154(b) by 887 days.

(21) Appl. No.: 14/660,204

(22) Filed: Mar. 17, 2015

(65) Prior Publication Data

US 2016/0078431 A1      Mar. 17, 2016

(30) Foreign Application Priority Data

Sep. 11, 2014   (IL) .......................................... 234613

(51) Int. Cl.
*G06Q 20/00*   (2012.01)
*G06Q 20/38*   (2012.01)
*G06Q 30/06*   (2012.01)

(52) U.S. Cl.
CPC ..... *G06Q 20/3823* (2013.01); *G06Q 30/0605* (2013.01)

(58) Field of Classification Search
None
See application file for complete search history.

(56) References Cited

U.S. PATENT DOCUMENTS

| 8,332,271 | B1 | 12/2012 | Wilder et al. | |
| 8,370,489 | B2 | 2/2013 | Mazumdar et al. | |
| 8,555,400 | B2* | 10/2013 | Shi | H04L 9/3006 380/277 |
| 8,626,579 | B2 | 1/2014 | Fordyce et al. | |
| 8,819,425 | B2* | 8/2014 | Rangsikitpho | H04L 63/0428 713/168 |

(Continued)

OTHER PUBLICATIONS

Volkhausen, Tobias, Paillier Cryptosystem: A Mathematical Introduction, Mar. 10, 2006 (Year: 2006).*

(Continued)

*Primary Examiner* — Steven S Kim
*Assistant Examiner* — John M Winter
(74) *Attorney, Agent, or Firm* — Foley and Lardner LLP (57) ABSTRACT

Aggregated transaction data from a transaction data provider may be encrypted and exchanged with a content item selection system using commutative encryption algorithms. The transaction data provider and content item selection system may utilize a set of common identifiers that are each encrypted using a respective commutative encryption algorithm of the transaction data provider or content item selection system. The other of the transaction data provider or content item selection system encrypts the single-encrypted common identifier using a respective commutative encryption algorithm to generate double encrypted common identifiers. The double encrypted common identifiers may be used to match a set of common identifiers with transaction data. The transaction data may be encrypted and/or may include random offset values.

12 Claims, 4 Drawing Sheets

(56) References Cited

U.S. PATENT DOCUMENTS

| | | | |
|---|---|---|---|
| 9,141,823 B2* | 9/2015 | Dawson | G06F 21/6227 |
| 2002/0154769 A1* | 10/2002 | Petersen | G06F 7/586 |
| | | | 380/42 |
| 2004/0024632 A1 | 2/2004 | Perry | |
| 2009/0327040 A1* | 12/2009 | McInerny | G06Q 30/02 |
| | | | 705/7.29 |
| 2012/0166272 A1* | 6/2012 | Wiley | G06Q 30/0246 |
| | | | 705/14.45 |
| 2013/0346298 A1 | 12/2013 | Bird et al. | |
| 2015/0195090 A1* | 7/2015 | Obana | H04L 9/3231 |
| | | | 380/30 |

OTHER PUBLICATIONS

Menezes et al., Handbook of Applied Cryptography, 1996, CRC Press (Year: 1996).*

* cited by examiner

ENCRYPTED AGGREGATED TRANSACTION DATA EXCHANGE WITH TRANSACTION DATA PROVIDER

CROSS-REFERENCE TO RELATED PATENT APPLICATIONS

This application claims foreign priority to Israeli Patent Application No. 234613, entitled, "Encrypted Aggregated Transaction Data Exchange With Transaction Data Provider," filed Sep. 11, 2014, the entirety of which is hereby incorporated by reference in its entirety.

BACKGROUND

In a networked environment, such as the Internet or other networks, first-party content providers can provide information for public presentation on resources, for instance webpages, documents, applications, and/or other resources. The first-party content can include text, video, and/or audio information provided by the first-party content providers via, for instance, a resource server for presentation on a client device over the Internet. The first-party content may be a webpage requested by the client device or a stand-alone application (e.g., a video game, a chat program, etc.) running on the client device. Additional third-party content can also be provided by third-party content providers for presentation on the client device together with the first-party content provided by the first-party content providers. For instance, the third-party content may be a public service announcement or advertisement that appears in conjunction with a requested resource, such as a webpage (e.g., a search result webpage from a search engine, a webpage that includes an online article, a webpage of a social networking service, etc.) or with an application (e.g., an advertisement within a game). Thus, a person viewing a resource can access the first-party content that is the subject of the resource as well as the third-party content that may or may not be related to the subject matter of the resource.

SUMMARY

Implementations described herein relate to securely retrieving aggregated transactional data from a transaction data provider for a set of device identifiers, such as account identifiers, browser cookies, or ad identifiers (such as an ID for Advertisers (IDFA) or AdID), without revealing the set of queried device identifiers and/or the underlying transactional data. For instance, a content provider, such as an advertiser, may have content items, such as advertisements, presented with resources viewed by users of client devices. Such users may view and/or click on the content item. In some instances, the user may complete the transaction with the content provider online. However, in some other instances, such users may complete a transaction with the content provider offline, such as a purchase in a physical store. In such cases, it may be useful to be able to match such offline and/or online transactions to the online presentation and/or selection of the content item. The transaction data provider and a content item selection system may utilize a set of common identifiers. The common identifiers can be mapped to device identifiers by the content item selection system. The common identifiers can also be mapped to transaction customer identifiers by the transaction data provider.

In an implementation, the transaction data provider may utilize a commutative encryption algorithm, such as a Diffie-Hellman encryption algorithm or a variant thereof, to encrypt a first set of common identifiers of common identifier and transaction value pairs. The first set of common identifiers may correspond to all common identifiers for which transaction value data exists for a predetermined period of time, such as the past 24 hours, past 48 hours, past week, etc. The transaction data provider may also encrypt the transaction value of the common identifier and transaction value pair using an additive homomorphic public key encryption algorithm, such as a Paillier algorithm. In some instances, the transaction values may be determined for a specific merchant, industry, region, etc. by setting any non-matching transaction values to the specific merchant, industry, region to a zero value. The commutative encrypted common identifier and additive homomorphic encrypted transaction value pairs are transmitted to the content item selection system and/or to a data storage system, such as a cloud storage system, to be retrieved by the content item selection system.

The content item selection system receives the commutative encrypted common identifier and additive homomorphic encrypted transaction value pairs and applies its own commutative encryption algorithm to the encrypted common identifier, thereby resulting in a double encrypted common identifier. The content item selection system also generates a randomized value for each double encrypted common identifier and stores the mapping of the randomized value to the corresponding double encrypted common identifier in a storage device. The content item selection system encrypts each randomized value using the public key of the additive homomorphic encryption algorithm and generates an encrypted sum of the transaction value and the corresponding randomized value for each of the now double encrypted common identifier and additive homomorphic encrypted transaction value pairs. The content item selection system transmits the double encrypted common identifier and encrypted sum of the transaction value and the corresponding randomized value pairs to the transaction data provider.

The content item selection system also encrypts a second set of common identifiers using the content item selection system's commutative encryption algorithm. The second set of common identifiers may be common identifiers for devices that viewed a content item (e.g., had an impression of a content item), clicked on a content item, or any other set of identifiers for which an aggregated transactional value is desired. The content item selection system transmits the commutative encrypted second set of common identifiers to the transaction data provider.

The transaction data provider receives the double encrypted common identifier and encrypted sum of the transaction value and the corresponding randomized value pairs and the single commutative encrypted second set of common identifiers from the content item selection system. The transaction data provider applies its own commutative encryption algorithm to the single encrypted second set of common identifiers, thereby resulting in a second set of double encrypted common identifiers. The transaction data provider matches the double encrypted common identifier and encrypted sum of the transaction value and the corresponding randomized value pairs to the second set of double encrypted common identifiers. For each matching double encrypted common identifier, the corresponding encrypted sum of the transaction value and the corresponding randomized value are multiplied together to result in an encrypted sum of transaction values and randomized values. The transaction data provider decrypts the encrypted sum of transaction values and randomized values to result in a sum of transaction values and randomized values. The sum of transaction values and randomized values and the set of matched double encrypted common identifiers are transmitted to the content item selection system.

The content item selection system determines a set of randomized values to subtract from the sum of transaction values and randomized values based on the stored mapping of randomized values to the corresponding double encrypted common identifiers and the received set of matched double encrypted identifiers. Thus, the content item selection system determines the aggregate transaction amount for the second set of common identifiers.

The aforementioned system permits the transaction data provider to not reveal specific transaction values for the common identifiers or an aggregate transaction amount for a specific merchant, industry, region, etc. In addition, the content item selection system does not reveal the specific common identifiers or other information for which aggregate transactional data is sought.

BRIEF DESCRIPTION OF THE DRAWINGS

The details of one or more implementations are set forth in the accompanying drawings and the description below. Other features, aspects, and advantages of the disclosure will become apparent from the description, the drawings, and the claims, in which:

It will be recognized that some or all of the figures are schematic representations for purposes of illustration. The figures are provided for the purpose of illustrating one or more embodiments with the explicit understanding that they will not be used to limit the scope or the meaning of the disclosure or claims.

DETAILED DESCRIPTION

Following below are more detailed descriptions of various concepts related to and implementations of, methods, apparatuses, and systems for securely retrieving aggregated transactional data from a transaction data provider for a set of device identifiers without revealing the set of queried device identifiers and/or the underlying transactional data. The various concepts introduced above and discussed in greater detail below may be implemented in any of numerous ways as the described concepts are not limited to any particular manner of implementation. Examples of specific implementations and applications are provided primarily for illustrative purposes.

I. Overview

Implementations described herein relate to securely retrieving aggregated transactional data from a transaction data provider for a set of device identifiers without revealing the set of queried device identifiers and/or the underlying transactional data. For instance, a content provider, such as an advertiser, may have content items, such as advertisements, presented with resources viewed by users of client devices. Such users may view and/or click on the content item. In some instances, the user may complete the transaction with the content provider online. However, in some other instances, such users may complete a transaction with the content provider offline, such as a purchase in a physical store. In such cases, it may be useful to be able to match such offline and/or online transactions to the online presentation and/or selection of the content item. The transaction data provider and a content item selection system may utilize a set of common identifiers. The common identifiers can be mapped to device identifiers by the content item selection system. The common identifiers can also be mapped to transaction customer identifiers by the transaction data provider.

The content item selection system and the transaction data provider may each use a commutative encryption algorithm with different parameters to encrypt the common identifiers the other party, either the content item selection system of the transaction data provider, double encrypts the common identifiers with their respective commutative encryption algorithm. Thus, both the content item selection system and the transaction data provider can use the double encrypted common identifiers to match data, such as transaction data, without revealing the common identifiers used.

The transaction data provider may also encrypt the transaction values with an additive homomorphic encryption algorithm to protect the specific values of the transaction data. The content item selection system may also use the public key of the additive homomorphic encryption algorithm to encrypt one or more randomized values. The encrypted randomized values may be multiplied by the encrypted transaction values to result in aggregated transaction and randomized values, thereby obscuring the aggregated transaction values. The transaction data provider may match the double encrypted common identifiers to a second set of double encrypted common identifiers for which the content item selection system is requesting an aggregated transaction value. The corresponding transaction values with the randomized value offset may be identified and decrypted by the transaction data provider and transmitted to the content item selection system. The content item selection system subtracts the randomized offset to calculate the aggregate transaction value for the second set of common identifiers for which the content item selection system requested an aggregated transaction value.

Figure 1:
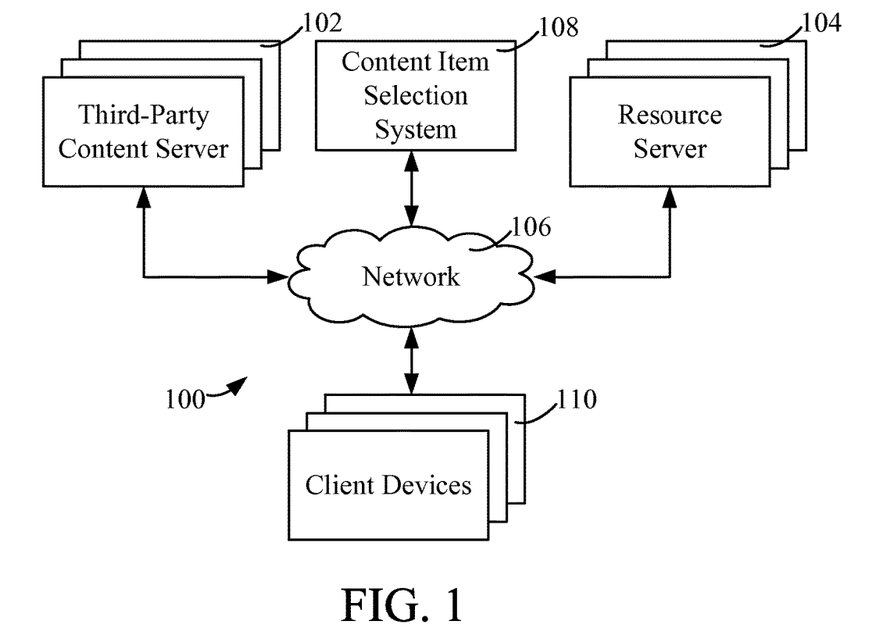
FIG. 1 is an overview depicting an implementation of a system for providing information via a computer network.

II. Overview of an Implementation of a System for Providing Information Via a Computer Network FIG. 1 is a block diagram of an implementation of a system 100 for providing information via at least one computer network such as the network 106. The network 106 may include a local area network (LAN), wide area network (WAN), a telephone network, such as the Public Switched Telephone Network (PSTN), a wireless link, an intranet, the Internet, or combinations thereof. The system 100 can also include at least one data processing system or processing module, such as a content item selection system 108. The content item selection system 108 can include at least one logic device, such as a computing device having a data processor, to communicate via the network 106, for instance with a resource server 104, a client device 110, and/or a third-party content server 102. The content item selection system 108 can include one or more data processors, such as a content placement processor, configured to execute instructions stored in a memory device to perform one or more operations described herein. In other words, the one or more data processors and the memory device of the content item selection system 108 may form a processing module. The processor may include a microprocessor, an application-specific integrated circuit (ASIC), a field-programmable gate array (FPGA), etc., or combinations thereof. The memory may include, but is not limited to, electronic, optical, magnetic, or any other storage or transmission device capable of providing processor with program instructions. The memory may include a floppy disk, compact disc read-only memory (CD-ROM), digital versatile disc (DVD), magnetic disk, memory chip, read-only memory (ROM), random-access memory (RAM), Electrically Erasable Programmable Read-Only Memory (EEPROM), erasable programmable read only memory (EPROM), flash memory, optical media, or any other suitable memory from which processor can read instructions. The instructions may include code from any suitable computer programming language such as, but not limited to, ActionScript®, C, C++, C#, Java®, ActionScript®, JavaScript®, JSON, Perl®, HTML, HTML5, XML, Python®, and Visual Basic®. The processing module may process instructions and provide data to display one or more content items to the resource server 104 and/or the client device 110. In addition to the processing module, the content item selection system 108 may include one or more databases configured to store data. The content item selection system 108 may also include an interface configured to receive data via the network 106 and to provide data from the content item selection system 108 to any of the other devices on the network 106. The content item selection system 108 can include a server, such as an advertisement server or otherwise.

The client device 110 can include one or more devices such as a computer, laptop, desktop, smart phone, tablet, personal digital assistant, set-top box for a television set, a smart television, or server device configured to communicate with other devices via the network 106. The device may be any form of portable electronic device that includes a data processor and a memory, i.e., a processing module. The memory may store machine instructions that, when executed by a processor, cause the processor to perform one or more of the operations described herein. The memory may also store data to display one or more resources, content items, etc. on the computing device. The processor may include a microprocessor, an application-specific integrated circuit (ASIC), a field-programmable gate array (FPGA), etc., or combinations thereof. The memory may include, but is not limited to, electronic, optical, magnetic, or any other storage or transmission device capable of providing processor with program instructions. The memory may include a floppy disk, compact disc read-only memory (CD-ROM), digital versatile disc (DVD), magnetic disk, memory chip, read-only memory (ROM), random-access memory (RAM), Electrically Erasable Programmable Read-Only Memory (EEPROM), erasable programmable read only memory (EPROM), flash memory, optical media, or any other suitable memory from which processor can read instructions. The instructions may include code from any suitable computer programming language.

The client device 110 can execute a software application (e.g., a web browser or other application) to retrieve content from other computing devices over network 106. Such an application may be configured to retrieve first-party content from a resource server 104. In some cases, an application running on the client device 110 may itself be first-party content (e.g., a game, a media player, a business application, etc.). In one implementation, the client device 110 may execute a web browser application which provides a browser window on a display of the client device. The web browser application that provides the browser window may operate by receiving input of a uniform resource locator (URL), such as a web address, from an input device (e.g., a pointing device, a keyboard, a touch screen, or another form of input device). In response, one or more processors of the client device 110 executing the instructions from the web browser application may request data from another device connected to the network 106 referred to by the URL address (e.g., a resource server 104). The other device may then provide webpage data and/or other data to the client device 110, which causes visual indicia to be displayed by the display of the client device 110. Accordingly, the browser window displays the retrieved first-party content, such as webpages from various websites, to facilitate interaction with the first-party content.

The resource server 104 can include a computing device, such as a server, configured to host a resource, such as a webpage or other resource (e.g., articles, comment threads, music, video, graphics, search results, information feeds, etc.). The resource server 104 may be a computer server (e.g., a file transfer protocol (FTP) server, file sharing server, web server, etc.) or a combination of servers (e.g., a data center, a cloud computing platform, etc.). The resource server 104 can provide resource data or other content (e.g., text documents, PDF files, and other forms of electronic documents) to the client device 110. In one implementation, the client device 110 can access the resource server 104 via the network 106 to request data to display a resource of the resource server 104.

One or more third-party content providers may have third-party content servers 102 to directly or indirectly provide data for third-party content items to the content item selection system 108 and/or to other computing devices via network 106. The content items may be in any format that may be presented on a display of a client device 110, for instance, graphical, text, image, audio, video, etc. The content items may also be a combination (hybrid) of the formats. The content items may be banner content items, interstitial content items, pop-up content items, rich media content items, hybrid content items, etc. The content items may also include embedded information such as hyperlinks, metadata, links, machine-executable instructions, annotations, etc. In some instances, the third-party content servers 102 may be integrated into the content item selection system 108 and/or the data for the third-party content items may be stored in a database of the content item selection system 108.

In one implementation, the content item selection system 108 can receive, via the network 106, a request for a content item to present with a resource. The received request may be received from a resource server 104, a client device 110, and/or any other computing device. The resource server 104 may be owned or ran by a first-party content provider that may include instructions for the content item selection system 108 to provide third-party content items with one or more resources of the first-party content provider on the resource server 104. In one implementation, the resource may include a webpage. The client device 110 may be a computing device operated by a user, which, when accessing a resource of the resource server 104, can make a request to the content item selection system 108 for content items to be presented with the resource, for instance.

The content item request can include requesting device information (e.g., a web browser type, an operating system type, one or more previous resource requests from the requesting device, one or more previous content items received by the requesting device, a language setting for the requesting device, a geographical location of the requesting device, a time of a day at the requesting device, a day of a week at the requesting device, a day of a month at the requesting device, a day of a year at the requesting device, etc.) and resource information (e.g., URL of the requested resource, one or more keywords of the content of the requested resource, text of the content of the resource, a title of the resource, a category of the resource, a type of the resource, a property of the resource, an interactivity level of the resource, a ranking of the resource, a popularity of the resource, a category of a publisher associated with the resource, a type of a publisher associated with the resource, a property of a publisher associated with the resource, etc.). The information or parameters that the content item selection system 108 receives can include a HyperText Transfer Protocol (HTTP) cookie which can contain a form of device identifier (e.g., a random number) that represents the client device 110. In some implementations, the device and/or the resource information or parameters may be appended to a content item request URL (e.g., /page/contentitem?devid=abc123&devnfo=A34r0). In some implementations, the device and/or the resource information or parameters may be encoded prior to being appended to the content item request URL. The requesting device and/or the resource information or parameters may be utilized by the content item selection system 108 to select third-party content items to be served with the requested resource and presented on a display of a client device 110.

In situations in which the systems discussed here collect personal information about users, or may make use of personal information, the users may be provided with an opportunity to control whether programs or features collect user information (e.g., information about a user's social network, social actions or activities, profession, a user's preferences, or a user's current location), or to control whether and/or how to receive content from the content server that may be more relevant to the user. In addition, certain data may be treated in one or more ways before it is stored or used, so that personally identifiable information is removed. For instance, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by a content server.

In some instances, a resource of a resource server 104 may include a search engine feature. The search engine feature may receive a search query (e.g., a string of text) via an input feature (an input text box, etc.). The search engine may search an index of documents (e.g., other resources, such as webpages, etc.) for relevant search results based on the search query. The search results may be transmitted as a second resource to present the relevant search results, such as a search result webpage, on a display of a client device 110. The search results may include webpage titles, hyperlinks, etc. One or more third-party content items may also be presented with the search results in a content item slot of the search result webpage. Accordingly, the resource server 104 and/or the client device 110 may request one or more content items from the content item selection system 108 to be presented in the content item slot of the search result webpage. The content item request may include additional information, such as the client device information, the resource information, a quantity of content items, a format for the content items, the search query string, keywords of the search query string, information related to the query (e.g., geographic location information and/or temporal information), etc. In some implementations, a delineation may be made between the search results and the third-party content items to avert confusion.

In some implementations, the third-party content provider may manage the selection and serving of content items by content item selection system 108. For instance, the third-party content provider may set bid values and/or selection criteria via a user interface that may include one or more content item conditions or constraints regarding the serving of content items. A third-party content provider may specify that a content item and/or a set of content items should be selected and served for client devices 110 associated with a certain geographic location or region, a certain language, a certain operating system, a certain web browser, etc. In another implementation, the third-party content provider may specify that a content item or set of content items should be selected and served when the resource, such as a webpage, document, etc., contains content that matches or is related to certain keywords, phrases, etc. The third-party content provider may set a single bid value for several content items, set bid values for subsets of content items, and/or set bid values for each content item. The third-party content provider may also set the types of bid values, such as bids based on whether a user clicks on the third-party content item, whether a user performs a specific action based on the presentation of the third-party content item (i.e., a conversion), whether the third-party content item is selected and served, and/or other types of bids.

III. Implementation of a System for Exchanging Encrypted Aggregated Transaction Data Between a Content Item Selection System and a Transaction Data Provider While the foregoing has provided an overview of a system 100 for selecting and serving content items to client devices 110, in some instances a user of a client device may complete a transaction with the third-party content provider in an offline or online setting. For instance, a user may view and/or click on an advertisement online and subsequently purchase a product from the third-party content provider offline at a physical store, via a telephone order, etc. Thus, it may be useful for the content item selection system to provide aggregated transaction values to a third-party content provider that accounts for online and offline transactions that are related to the online impression and/or click of the content item.

Figure 2:
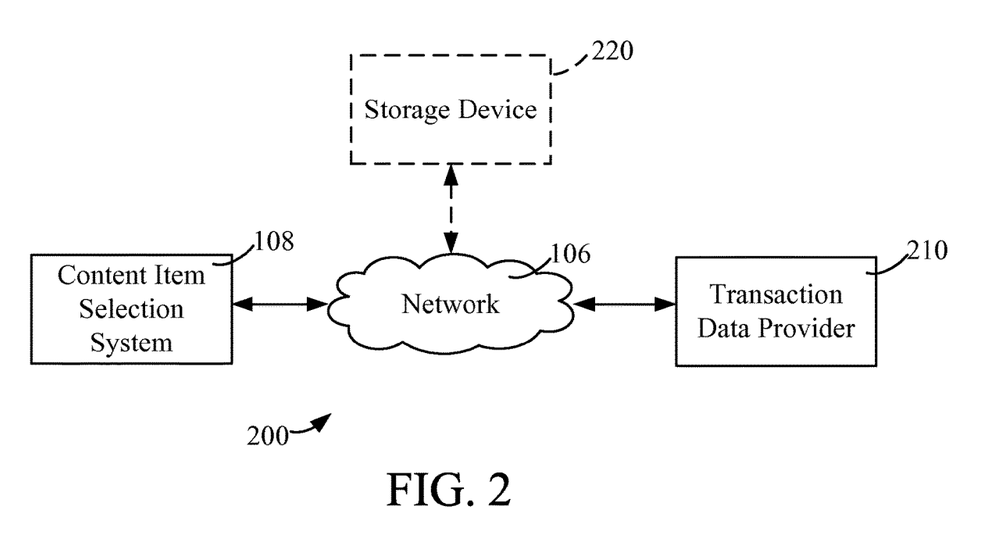
FIG. 2 is a block diagram of an implementation of a system for exchanging encrypted aggregated transaction data between a content item selection system and a transaction data provider.

FIG. depicts a system 200 for exchanging encrypted aggregated transaction data between the content item selection system 108 and a transaction data provider 210. The transaction data provider 210 can include a computing device, such as a server, that hosts transaction data, such as credit card transaction data, debit card transaction data, etc. The transaction data may include a transaction customer identifier, a merchant identifier, a transaction value, a timestamp, a geographic location, etc. The transaction data provider 210 may be a computer server or a combination of servers (e.g., a data center, a cloud computing platform, etc.).

The system 200 may also include a storage device 220 that may store data transmitted by the content item selection system 108 and/or the transaction data provider 210. The storage device 220 may be a cloud storage system accessible by both the transaction data provider 210 and the content item selection system 108 such that both can upload data to the storage device 220 to be retrieved by the other of the transaction data provider 210 or content item selection system 108 at a subsequent time. For instance, the transaction data provider 210 may perform batched uploads of encrypted transaction data, described in greater detail herein, to the storage device 220 that may subsequently be retrieved by the content item selection system 108. Similarly, the content item selection system 108 may also perform batched uploads of encrypted data, described in greater detail herein, to the storage device 220 that may subsequently be retrieved by the transaction data provider 210.

In other implementations, the encrypted transaction data and/or other encrypted data may be directly transmitted to and/or from the content item selection system 108 from and/or to the transaction data provider 210 via network 106.

Figure 3:
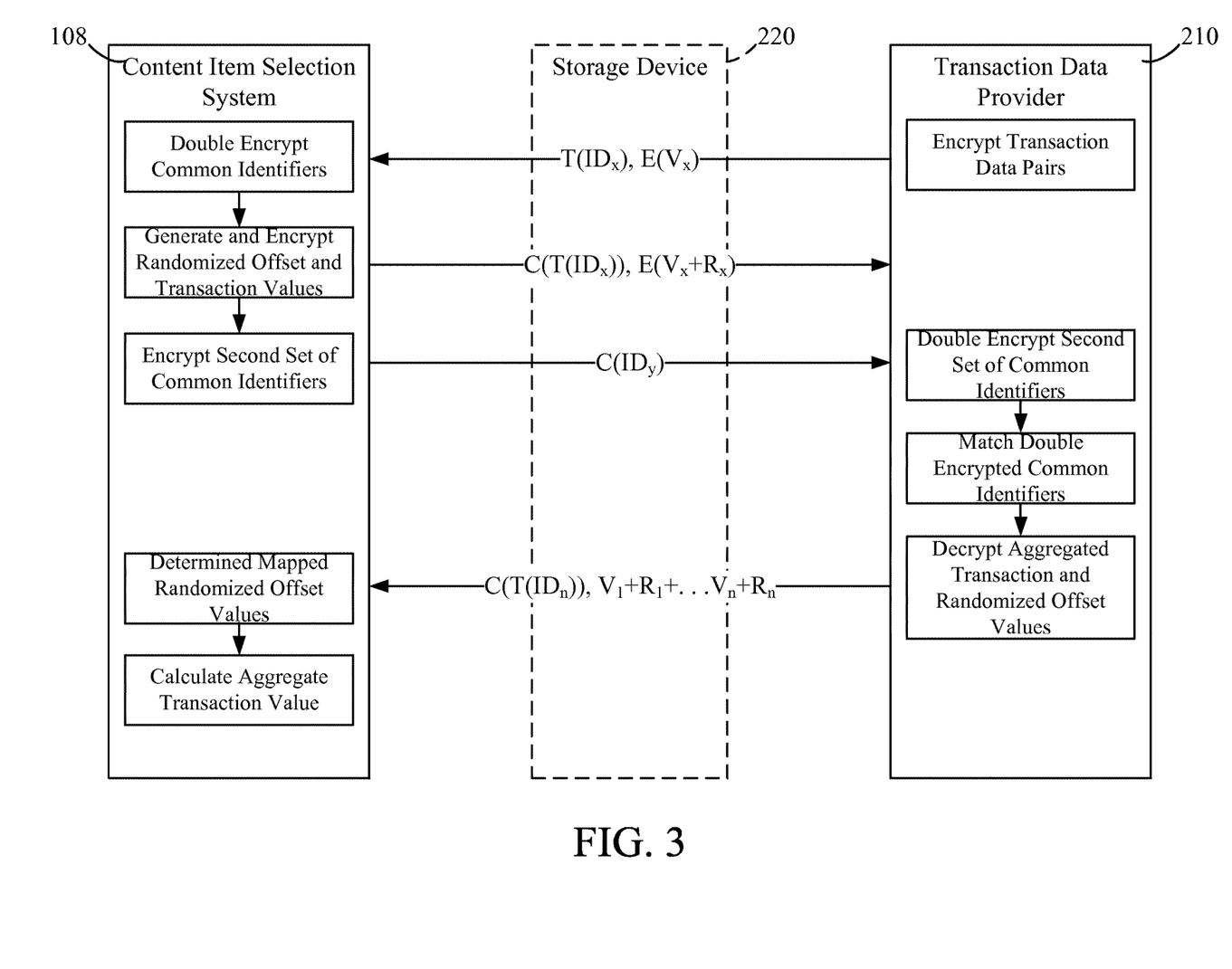
FIG. 3 is a process diagram of an implementation of for exchanging encrypted aggregated transaction data between a content item selection system and a transaction data provider.

IV. Implementations of Processes for Exchanging Encrypted Aggregated Transaction Data FIG. 3 depicts an implementation of a process for exchanging encrypted aggregated transaction data between the transaction data provider 210 and the content item selection system 108. In some implementations, the storage device 220 may be used to store the transmitted data from the transaction data provider 210 and/or the content item selection system 108 to be retrieved the by the other of the transaction data provider 210 and/or the content item selection system 108.

In an implementation, a transaction data provider 210 and a content item selection system 108 may utilize a common identifier representative of a user and/or device. For instance, the content item selection system 108 may provide a set of device identifiers and the transaction data provider 210 may provide a set of transaction customer identifiers to a trusted third-party (not shown). The trusted third-party may then generate a mapping of common identifiers that are matched to the transaction customer identifiers of the transaction data provider 210 and a mapping of common identifiers that are matched to the device identifiers of the content item selection system 108. In other instances, the common identifier may be an agreed upon common identifier by the content item selection system 108 and/or transaction data provider 210, such as a randomized common identifier, an e-mail address identifier, a name, etc.

The process described herein utilizes three encryption algorithms for encrypting data transferred between the content item selection system 108 and the transaction data provider 210. A first encryption algorithm utilized by the content item selection system 108 is a commutative encryption algorithm, such as a Diffie-Hellman algorithm or a variant thereof. The content item selection system 108 has a first secret value used to generate the encrypted values of data to be transmitted to the transaction data provider 210. The first encryption algorithm may be represented by the function $C(x)$, where x is the data to be encrypted, such as one or more of the common identifiers.

A second encryption algorithm utilized by the transaction data provider 210 is also a commutative encryption algorithm, such as a Diffie-Hellman algorithm or a variant thereof. The transaction data provider 210 has a second secret value, different from the first secret value, used to generate the encrypted values of data to be transmitted to the content item selection system 108. The second encryption algorithm may be represented by the function $T(x)$, where x is the data to be encrypted, such as one or more of the common identifiers.

A third encryption algorithm utilized by the transaction data provider 210 is an additive homomorphic encryption algorithm, such as a Paillier algorithm. The additive homomorphic encryption algorithm permits computations to be carried out on the ciphertext or values that, when decrypted, results in the underlying plaintext or values being added together. The third encryption algorithm may be represented by the function $E(x)$, where x is the data to be encrypted, such as one or more transaction values from transaction data. The transaction data provider 210 may store the private key for the additive homomorphic algorithm for decrypting the encrypted data. The content item selection system 108 may be provided a public key for the additive homomorphic algorithm for encrypting data for the computations to be carried out with encrypted transaction values.

The first and second encryption algorithms are commutative such that $C(T(x))=T(C(x))$. Thus, the content item selection system 108 may encrypt data using the first encryption algorithm $C(x)$ and the transaction data provider 210 can encrypt data using the second encryption algorithm $T(x)$. The encrypted data may be exchanged and, when the other applies their encryption algorithm to the encrypted data, the double encrypted data can be matched.

For the additive homomorphic algorithm, encrypted data, such as $E(x)$, can be combined with other encrypted data, such as $E(y)$, via multiplication such that the resulting encrypted data adds the values $x+y$ when decrypted. That is, $E(x) \times E(y)=E(x+y)$. The encrypted data may be generated using the public key for the additive homomorphic algorithm. To recover the added value of $x+y$, the private key of the additive homomorphic algorithm is used.

Still referring to FIG. 3, the transaction data provider 210 may have transaction data pairs, $(ID_x, V_x)$, where $ID_x$ is the common identifier and $V_x$ is the corresponding transaction value for the common identifier. The transaction data pairs may be for all common identifiers having transactions for a predetermined previous period of time, such as the past hour, two hours, four hours, six hours, 12 hours, 24 hours, 48 hours, week, etc. In some implementations, the transaction data may be limited to a specific merchant, industry, region, etc. That is, the transaction data provider 210 may set a transaction value of a transaction data pair to zero if the transaction data is not for the specific merchant, industry, region, etc.

The transaction data provider 210 encrypts the transaction data pairs using the second encryption algorithm and the third encryption algorithm. That is, the transaction data provider 210 encrypts all the common identifiers of the transaction data pairs using the second encryption algorithm to generate a first set of encrypted common identifiers, $T(ID_x)$. The transaction data provider also encrypts the transaction values using the third encryption algorithm to generate encrypted transaction values, $E(V_x)$. The encrypted transaction data pairs, $T(ID_x)$, $E(V_x)$, are transmitted to the content item selection system 108 and/or the storage device 220. In some implementations, the transaction values, $V_x$, may be allocated, for instance, 20 bits for each transaction value in a payload.

The content item selection system 108 receives the encrypted transaction data pairs, $T(ID_x)$, $E(V_x)$, either directly from the transaction data provider 210 and/or from the storage device 220. The content item selection system 108 double encrypts the first set of encrypted common identifiers, $T(ID_x)$, using the first encryption algorithm, resulting in a first set of double encrypted common identifiers, $C(T(ID_x))$. The content item selection system 108 generates a randomized offset value, $R_x$, such as a random large number, for each double encrypted common identifier and stores the mapped randomized offset values and double encrypted common identifiers in a storage device. The content item selection system 108 also encrypts the randomized offset value, $R_x$, using the public key and the third encryption algorithm to result in encrypted randomized offset values, $E(R_x)$. The content item selection system multiplies the ciphertext of the encrypted randomized offset values, $E(R_x)$, with the ciphertext of the encrypted transaction values, $E(V_x)$. The resulting cipher text is the encrypted sum of the randomized offset value and the transaction value, $E(V_x+R_x)$. Thus, the content item selection system 108 generates encrypted data pairs having the first set of double encrypted common identifiers, $C(T(ID_x))$, and the encrypted sum of the randomized offset value and the transaction value, $E(V_x+R_x)$. These encrypted data pairs, $C(T(ID_x))$, $E(V_x+R_x)$, are transmitted to the transaction data provider 210 and/or the storage device 220. In some implementations, the encrypted data pairs may be randomly shuffled.

In some implementations, the encrypted sums of the randomized offset value and the transaction value may be allocated, for instance, 20 bits for each transaction value and another neighboring 20 bits to account for the random offset value. To the 40 bits for the payload to be transmitted, a random value from 0 to $(2^{40}-2^{20})$ is added, which is a value between 0 and $2^{20}$ cents, or approximately $0 to $10,000. In some implementations, a larger bit allocation than 40 bits may be used for larger random values to be added. In some implementations, 30 neighboring bits may be used to account for the random offset value. A random 50 bit value may be added as the random offset value. In still further implementations, 40 neighboring bits may be used to account for the random offset value. A random 60 bit value may be added as the random offset value.

The content item selection system 108 also encrypts a second set of common identifiers, $ID_y$, using the first encryption algorithm, $C(x)$, for which the content item selection system 108 requests an aggregated transaction value. The second set of common identifiers may correspond to common identifiers that viewed a content item of a specific merchant, common identifiers that clicked a content item of a specific merchant, common identifiers that viewed content items for an industry, common identifiers that clicked on content items for an industry, common identifiers that viewed content items for a region, common identifiers that clicked on content items for a region, etc. The common identifiers may be further segmented by keyword leading to presentation of the content item, device types, geographic regions, etc. The encrypted second set of common identifiers, $C(ID_y)$, are transmitted to the transaction data provider 210 and/or the storage device 220. In some implementations, the number of common identifiers of the second set of common identifiers may need to be above a predetermined number, such as at least 50 common identifiers.

The transaction data provider 210 receives the encrypted second set of common identifiers, $C(ID_y)$, either directly from the content item selection system 108 and/or from the storage device 220. In some implementations, the transaction data provider 210 may compare the number of encrypted second set of common identifiers to the predetermined number to ensure a sufficient amount of encrypted second set of common identifiers are provided by the content item selection system 108. The transaction data provider 210 double encrypts the received encrypted second set of common identifiers, $C(ID_y)$, using the second encryption algorithm to generate a second set of double encrypted common identifiers, $T(C(ID_y))$. The transaction data provider 210 may also compare the second set of double encrypted common identifiers to previous sets of double encrypted common identifiers to determine if there is a an overlap greater than a predetermined number, such as no more than five, ten, fifteen, etc. double encrypted common identifiers can overlap with a previous sets of double encrypted common identifiers. In addition, the transaction data provider 210 can compare the second set of double encrypted common identifiers to the first set of double encrypted common identifiers to determine if invalid common identifiers are included in the second set of double encrypted common identifiers.

The transaction data provider 210 matches the second set of double encrypted common identifiers, $T(C(ID_y))$, to the first set of double encrypted common identifiers, $C(T(ID_x))$, from the encrypted data pairs. The transaction data provider 210 then generates an aggregated sum of transaction values and randomized offset values, $V_1-FR_1+\ldots V_n+R_n$, where n is the number of matching double encrypted common identifiers. In some implementations, the transaction data provider 210 may multiply the encrypted sums of the randomized offset values and the transaction values, $E(V_x-R_x)$, for the matching double encrypted common identifiers, which results in an encrypted aggregate sum of randomized offset values and the transaction values, $E(V_1+R_1+\ldots V_n+R_n)$. The transaction data provider 210 may then decrypt the encrypted aggregate sum of randomized offset values and the transaction values using the private key for the additive homomorphic encryption algorithm. In other implementations, the transaction data provider may decrypt each matching encrypted sum of the randomized offset value and the transaction value, $E(V_x+R_x)$, and add the decrypted values together for each matching double encrypted common identifier.

The transaction data provider 210 also generates a set of matching double encrypted identifiers based on matching the second set of double encrypted common identifiers, $T(C(ID_y))$, to the first set of double encrypted common identifiers, $C(T(ID_x))$, from the encrypted data pairs. That is, the transaction data provider 210 generates a set of matching double encrypted common identifiers, $C(T(ID_n))$ or $T(C(ID_n))$. The set of matching double encrypted common identifiers, $C(T(ID_n))$ or $T(C(ID_n))$, and the aggregated sum of transaction values and randomized offset values, $V_1+R_1+\ldots V_n+R_n$, are transmitted to the content item selection system 108 and/or the storage device 220. In some implementations, the set of matching double encrypted common identifiers, $C(T(ID_n))$ or $T(C(ID_n))$, may be randomly shuffled.

The content item selection system 108 receives the set of matching double encrypted common identifiers, $C(T(ID_n))$ or $T(C(ID_n))$, and the aggregated sum of transaction values and randomized offset values, $V_1+R_1+\ldots V_n+R_n$, either directly from the transaction data provider 210 and/or from the storage device 220. The content item selection system 108 determines a set of randomized offset values to subtract from the aggregated sum of transaction values and randomized offset values, $V_1+R_1+\ldots V_n+R_n$, based on the map of randomized offset values to double encrypted common identifiers and the set of matching double encrypted common identifiers, $C(T(ID_n))$ or $T(C(ID_n))$. The content item selection system 108 then calculates the aggregated transaction value by subtracting the set of randomized offset values, $R_1 + \ldots R_n$, from the aggregated sum of transaction values and randomized offset values, $V_1+R_1+ \ldots V_n+R_n$, resulting in the aggregated transaction value, $V_1 + \ldots V_n$.

In some implementations, an estimated total transaction value may be calculated using the aggregated transaction value and a market share (estimated or known) of the transaction data provider 210. That is, if the transaction data provider 210 has a known or estimated market share of 30%, then the calculated aggregated transaction value may be divided by 0.3 to calculate the estimated total transaction value.

In some implementations, the second set of common identifiers may be a test group of common identifiers (e.g., common identifiers that viewed a content item, selected a content item, etc.) and a third set of common identifiers may be a control group of common identifiers (e.g., common identifiers that did not view a content item, did not select a content item, etc.). A test aggregated transaction value for the second set of common identifiers and a control aggregated transaction value for the third set of common identifiers may be calculated according to the aforementioned process. A transaction value lift may be calculated by dividing the test aggregated transaction value by the control aggregated transaction value.

The aggregated transaction value, estimated total transaction value, and/or transaction value lift may be included in a report to a content item provider, used for automated bidding by providing additional transaction value information, etc.

Figure 4:
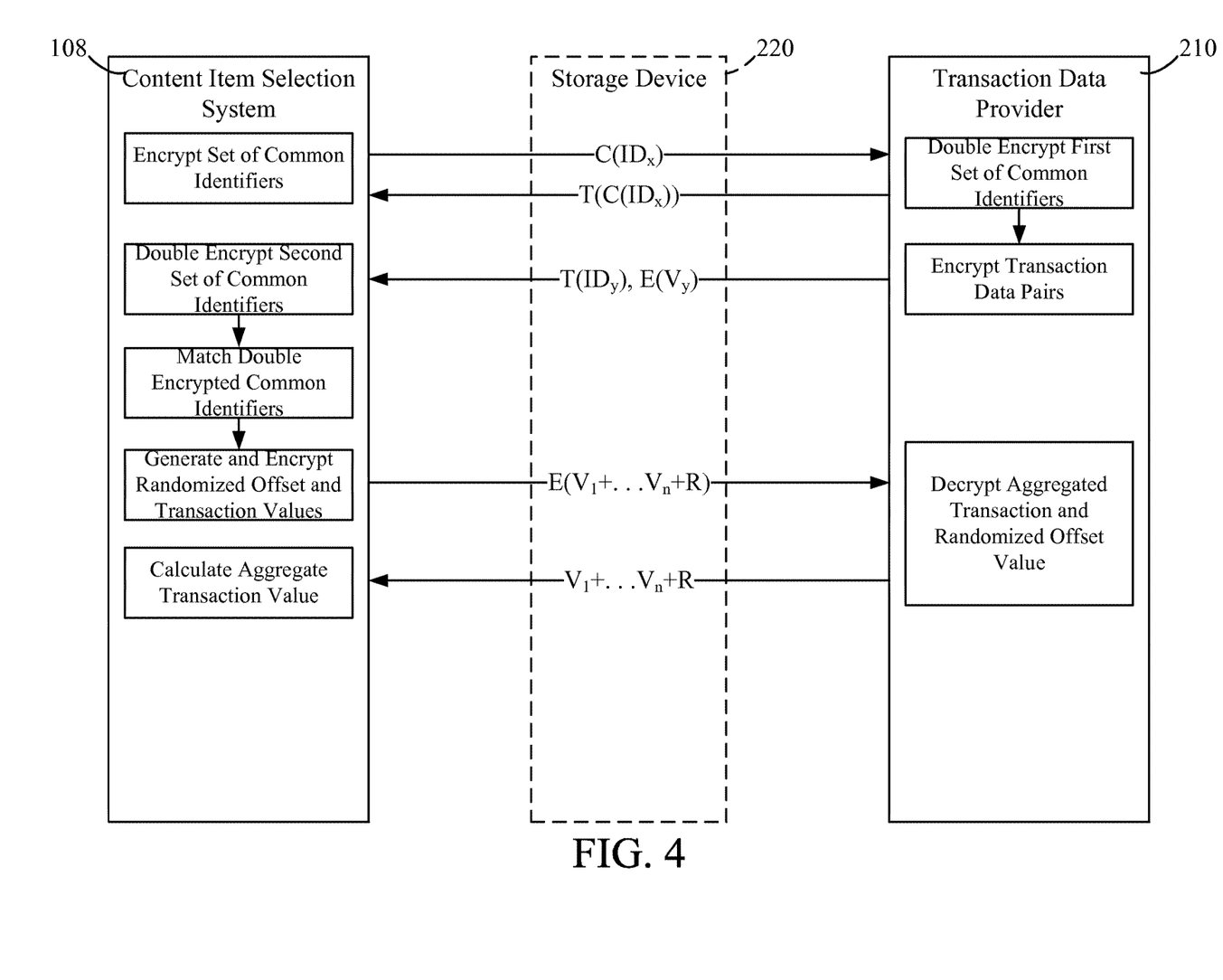
FIG. 4 is a process diagram of another implementation of for exchanging encrypted aggregated transaction data between a content item selection system and a transaction data provider.

FIG. 4 depicts another implementation of a process for exchanging encrypted aggregated transaction data between the transaction data provider 210 and the content item selection system 108. In some implementations, the storage device 220 may be used to store the transmitted data from the transaction data provider 210 and/or the content item selection system 108 to be retrieved the by the other of the transaction data provider 210 and/or the content item selection system 108. The process of FIG. 4 utilizes the first, second, and third encryption algorithms described above in reference to FIG. 3.

The content item selection system 108 encrypts a first set of common identifiers, $ID_x$, using the first encryption algorithm, $C(x)$, for which the content item selection system 108 requests an aggregated transaction value. The first set of common identifiers may correspond to common identifiers that viewed a content item of a specific merchant, common identifiers that clicked a content item of a specific merchant, common identifiers that viewed content items for an industry, common identifiers that clicked on content items for an industry, common identifiers that viewed content items for a region, common identifiers that clicked on content items for a region, etc. The common identifiers may be further segmented by keyword leading to presentation of the content item, device types, geographic regions, etc. The encrypted first set of common identifiers, $C(ID_x)$, are transmitted to the transaction data provider 210 and/or the storage device 220. In some implementations, the number of common identifiers of the second set of common identifiers may need to be above a predetermined number, such as at least 50 common identifiers.

The transaction data provider 210 receives the encrypted second set of common identifiers, $C(ID_x)$, either directly from the content item selection system 108 and/or from the storage device 220. The transaction data provider 210 double encrypts the received encrypted first set of common identifiers, $C(ID_x)$, using the second encryption algorithm to generate a first set of double encrypted common identifiers, $T(C(ID_x))$. The transaction data provider 210 may also compare the first set of double encrypted common identifiers to previous sets of double encrypted common identifiers to determine if there is a an overlap greater than a predetermined number, such as no more than five, ten, fifteen, etc. double encrypted common identifiers can overlap with a previous sets of double encrypted common identifiers. In addition, the transaction data provider 210 can compare the first set of double encrypted common identifiers to a second set of double encrypted common identifiers, described below, to determine if invalid common identifiers are included in the first set of double encrypted common identifiers.

The transaction data provider 210 may have transaction data pairs, $(ID_y, V_y)$, where $ID_y$ is the common identifier and $V_y$ is the corresponding transaction value for the common identifier. The transaction data pairs may be for all common identifiers having transactions for a predetermined previous period of time, such as the past hour, two hours, four hours, six hours, 12 hours, 24 hours, 48 hours, week, etc. In some implementations, the transaction data may be limited to a specific merchant, industry, region, etc. That is, the transaction data provider 210 may set a transaction value of a transaction data pair to zero if the transaction data is not for the specific merchant, industry, region, etc.

The transaction data provider 210 encrypts the transaction data pairs using the second encryption algorithm and the third encryption algorithm. That is, the transaction data provider 210 encrypts all the common identifiers of the transaction data pairs using the second encryption algorithm to generate a second set of encrypted common identifiers, $T(ID_y)$. The transaction data provider also encrypts the transaction values using the third encryption algorithm to generate encrypted transaction values, $E(V_y)$. The encrypted transaction data pairs, $T(ID_y), E(V_y)$, and the encrypted first set of double encrypted common identifiers, $T(C(ID_x))$, are transmitted to the content item selection system 108 and/or the storage device 220.

The content item selection system 108 receives the encrypted transaction data pairs, $T(ID_y), E(V_y)$, and the encrypted first set of double encrypted common identifiers, $T(C(ID_x))$, either directly from the transaction data provider 210 and/or from the storage device 220. The content item selection system 108 double encrypts the second set of encrypted common identifiers, $T(ID_y)$, using the first encryption algorithm, resulting in a second set of double encrypted common identifiers, $C(T(ID_y))$.

The content item selection system 108 matches the second set of double encrypted common identifiers, $C(T(ID_y))$, to the first set of double encrypted common identifiers, $T(C(ID_x))$, from the encrypted data pairs. The content item selection system 108 also generates a randomized offset value, R, such as a random large number. The content item selection system 108 encrypts the randomized offset value, R, using the public key and the third encryption algorithm to result in encrypted randomized offset values, $E(R)$. The content item selection system multiplies the ciphertext of the encrypted randomized offset values, $E(R)$, and the ciphertext of each of the encrypted transaction values, $E(V_1), \ldots, E(V_n)$, for the set of matching double encrypted common identifiers, $C(T(ID_x))$ or $T(C(ID_n))$, where n is the number of matching double encrypted common identifiers. The resulting cipher text is the encrypted aggregate sum of the randomized offset value and the transaction values for the matching double encrypted common identifiers, $E(V_1+ \ldots V_n+R)$. The encrypted aggregate sum of the randomized offset value and the transaction values, $E(V_1 + \ldots V_n + R)$, is transmitted to the transaction data provider 210 and/or the storage device 220.

The transaction data provider 210 receives the encrypted aggregate sum of the randomized offset value and the transaction values, $E(V_1 + \ldots V_n + R)$, either directly from the content item selection system 108 and/or from the storage device 220. The transaction data provider 210 may then decrypt the encrypted aggregate sum of randomized offset value and the transaction values using the private key for the additive homomorphic encryption algorithm. The aggregated sum of transaction values and randomized offset value, $V_1 + \ldots V_n + R$, is transmitted to the content item selection system 108 and/or the storage device 220.

The content item selection system 108 receives the aggregated sum of transaction values and randomized offset value, $V_1 + \ldots V_n + R$, either directly from the transaction data provider 210 and/or from the storage device 220. The content item selection system 108 calculates the aggregated transaction value by subtracting the set of randomized offset value, R, from the aggregated sum of transaction values and randomized offset value, $V_1 + \ldots V_n + R$, resulting in the aggregated transaction value, $V_1 + \ldots V_n$.

In some implementations, an estimated total transaction value may be calculated using the aggregated transaction value and a market share (estimated or known) of the transaction data provider 210. That is, if the transaction data provider 210 has a known or estimated market share of 30%, then the calculated aggregated transaction value may be divided by 0.3 to calculate the estimated total transaction value.

In some implementations, the second set of common identifiers may be a test group of common identifiers (e.g., common identifiers that viewed a content item, selected a content item, etc.) and a third set of common identifiers may be a control group of common identifiers (e.g., common identifiers that did not view a content item, did not select a content item, etc.). A test aggregated transaction value for the second set of common identifiers and a control aggregated transaction value for the third set of common identifiers may be calculated according to the aforementioned process. A transaction value lift may be calculated by dividing the test aggregated transaction value by the control aggregated transaction value.

The aggregated transaction value, estimated total transaction value, and/or transaction value lift may be included in a report to a content item provider, used for automated bidding by providing additional transaction value information, etc.

V. Implementation of a Computing System

Figure 5:
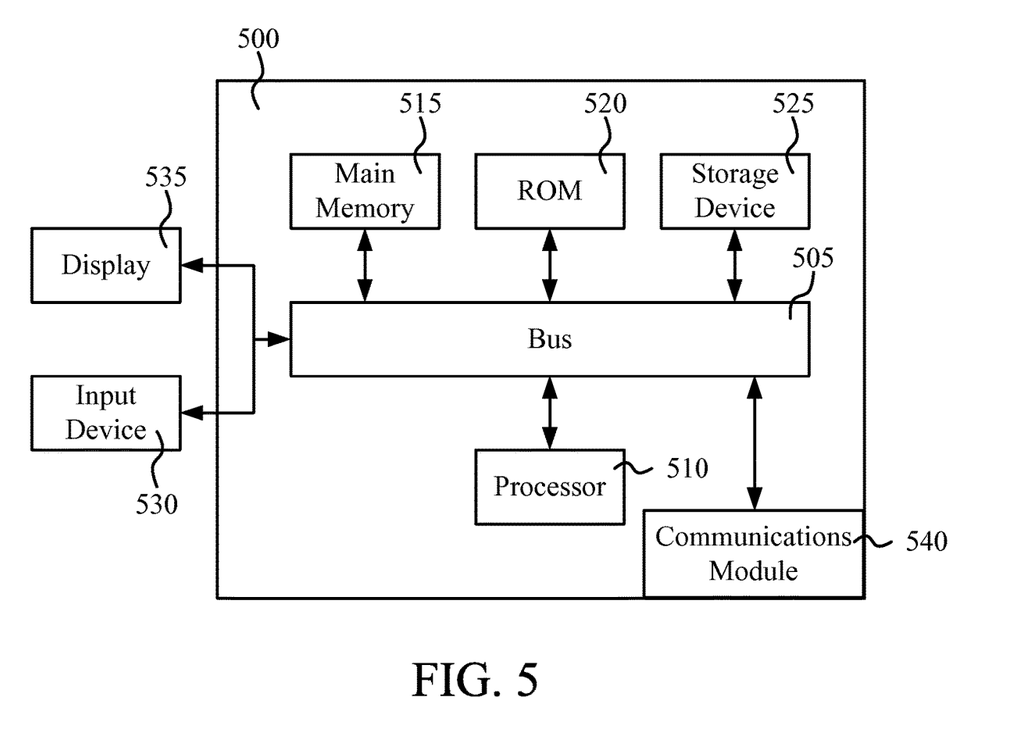
FIG. 5 is a block diagram depicting a general architecture for a computer system that may be employed to implement various elements of the systems and methods described and illustrated herein.

FIG. 5 is a block diagram of a computing system 500 that can be used to implement the client device 110, content item selection system 108, third-party content server 102, resource server 104, transaction data provider 210, storage device 220, etc. The computing system 500 includes a bus 505 or other communication component for communicating information and a processor 510 coupled to the bus 505 for processing information. The computing system 500 can also include one or more processors 510 coupled to the bus for processing information. The computing system 500 also includes main memory 515, such as a RAM or other dynamic storage device, coupled to the bus 505 for storing information, and instructions to be executed by the processor 510. Main memory 515 can also be used for storing position information, temporary variables, or other intermediate information during execution of instructions by the processor 510. The computing system 500 may further include a ROM 520 or other static storage device coupled to the bus 505 for storing static information and instructions for the processor 510. A storage device 525, such as a solid state device, magnetic disk or optical disk, is coupled to the bus 505 for persistently storing information and instructions. Computing device 500 may include, but is not limited to, digital computers, such as laptops, desktops, workstations, personal digital assistants, servers, blade servers, mainframes, cellular telephones, smart phones, mobile computing devices (e.g., a notepad, e-reader, etc.) etc.

The computing system 500 may be coupled via the bus 505 to a display 535, such as a Liquid Crystal Display (LCD), Thin-Film-Transistor LCD (TFT), an Organic Light Emitting Diode (OLED) display, LED display, Electronic Paper display, Plasma Display Panel (PDP), and/or other display, etc., for displaying information to a user. An input device 530, such as a keyboard including alphanumeric and other keys, may be coupled to the bus 505 for communicating information and command selections to the processor 510. In another implementation, the input device 530 may be integrated with the display 535, such as in a touch screen display. The input device 530 can include a cursor control, such as a mouse, a trackball, or cursor direction keys, for communicating direction information and command selections to the processor 510 and for controlling cursor movement on the display 535.

According to various implementations, the processes and/or methods described herein can be implemented by the computing system 500 in response to the processor 510 executing an arrangement of instructions contained in main memory 515. Such instructions can be read into main memory 515 from another computer-readable medium, such as the storage device 525. Execution of the arrangement of instructions contained in main memory 515 causes the computing system 500 to perform the illustrative processes and/or method steps described herein. One or more processors in a multi-processing arrangement may also be employed to execute the instructions contained in main memory 515. In alternative implementations, hard-wired circuitry may be used in place of or in combination with software instructions to effect illustrative implementations. Thus, implementations are not limited to any specific combination of hardware circuitry and software.

The computing system 500 also includes a communications module 540 that may be coupled to the bus 505 for providing a communication link between the system 500 and the network 106. As such, the communications module 540 enables the processor 510 to communicate, wired or wirelessly, with other electronic systems coupled to the network 106. For instance, the communications module 540 may be coupled to an Ethernet line that connects the system 500 to the Internet or another network 106. In other implementations, the communications module 540 may be coupled to an antenna (not shown) and provides functionality to transmit and receive information over a wireless communication interface with the network 106.

In various implementations, the communications module 540 may include one or more transceivers configured to perform data communications in accordance with one or more communications protocols such as, but not limited to, WLAN protocols (e.g., IEEE 802.11 a/b/g/n/ac/ad, IEEE 802.16, IEEE 802.20, etc.), PAN protocols, Low-Rate Wireless PAN protocols (e.g., ZigBee, IEEE 802.15.4-2003), Infrared protocols, Bluetooth protocols, EMI protocols including passive or active RFID protocols, and/or the like.

The communications module 540 may include one or more transceivers configured to communicate using different types of protocols, communication ranges, operating power requirements, RF sub-bands, information types (e.g., voice or data), use scenarios, applications, and/or the like. In various implementations, the communications module 540 may comprise one or more transceivers configured to support communication with local devices using any number or combination of communication standards.

In various implementations, the communications module 540 can also exchange voice and data signals with devices using any number or combination of communication standards (e.g., GSM, CDMA, TDNM, WCDMA, OFDM, GPRS, EV-DO, WiFi, WiMAX, S02.xx, UWB, LTE, satellite, etc). The techniques described herein can be used for various wireless communication networks 106 such as Code Division Multiple Access (CDMA) networks, Time Division Multiple Access (TDMA) networks, Frequency Division Multiple Access (FDMA) networks, Orthogonal FDMA (OFDMA) networks, Single-Carrier FDMA (SC-FDMA) networks, etc. A CDMA network can implement a radio technology such as Universal Terrestrial Radio Access (UTRA), cdma2000, etc. UTRA includes Wideband-CDMA (W-CDMA) and Low Chip Rate (LCR). CDMA2000 covers IS-2000, IS-95, and IS-856 standards. A TDMA network can implement a radio technology such as Global System for Mobile Communications (GSM). An OFDMA network can implement a radio technology such as Evolved UTRA (E-UTRA), IEEE 802.11, IEEE 802.16, IEEE 802.20, Flash-OFDM, etc. UTRA, E-UTRA, and GSM are part of Universal Mobile Telecommunication System (UMTS). Long Term Evolution (LTE) is an upcoming release of UMTS that uses E-UTRA. UTRA, E-UTRA, GSM, UMTS, and LTE are described in documents from an organization named "3rd Generation Partnership Project" (3GPP). CDMA2000 is described in documents from an organization named "3rd Generation Partnership Project 2" (3GPP2).

Although an implementation of a computing system 500 has been described in FIG. 5, implementations of the subject matter and the functional operations described in this specification can be implemented in other types of digital electronic circuitry, or in computer software, firmware, or hardware, including the structures disclosed in this specification and their structural equivalents, or in combinations of one or more of them.

Implementations of the subject matter and the operations described in this specification can be implemented in digital electronic circuitry, or in computer software embodied on a tangible medium, firmware, or hardware, including the structures disclosed in this specification and their structural equivalents, or in combinations of one or more of them. The subject matter described in this specification can be implemented as one or more computer programs, i.e., one or more modules of computer program instructions, encoded on one or more computer storage media for execution by, or to control the operation of, data processing apparatus. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate components or media (e.g., multiple CDs, disks, or other storage devices). Accordingly, the computer storage medium is both tangible and non-transitory.

The operations described in this specification can be performed by a data processing apparatus on data stored on one or more computer-readable storage devices or received from other sources.

The terms "data processing system," "computing system," or "system" encompass all kinds of apparatuses, devices, and machines for processing data, including, without limitation, a programmable processor, a computer, a system on a chip, or multiple ones, a portion of a programmed processor, or combinations of the foregoing. The apparatus can include special purpose logic circuitry, e.g., an FPGA or an ASIC. The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

Processors suitable for the execution of a computer program include, without limitation, both general and special purpose microprocessors, and any one or more processors of any kind of digital computer. Generally, a processor will receive instructions and data from a read only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including without limitation semiconductor memory devices, e.g., EPROM, EEPROM, and flash memory devices; magnetic disks, e.g., internal hard disks or removable disks; magneto optical disks; and CD ROM and DVD disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube) or LCD monitor, for displaying information to the user and a keyboard and a pointing device, e.g., a mouse or a trackball, by which the user can provide input to the computer. Other kinds of devices can be used to provide for interaction with a user as well; feedback provided to the user can be any form of sensory feedback, e.g., visual feedback, auditory feedback, or tactile feedback; and input from the user can be received in any form, including acoustic, speech, or tactile input.

While this specification contains many specific implementation details, these should not be construed as limitations on the scope of what may be claimed, but rather as descriptions of features specific to particular implementations. Certain features described in this specification in the context of separate implementations can also be implemented in combination in a single implementation. Conversely, various features described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated in a single software product or packaged into multiple software products embodied on tangible media.

References to "or" may be construed as inclusive so that any terms described using "or" may indicate any of a single, more than one, and all of the described terms.

Thus, particular implementations of the subject matter have been described. Other implementations are within the scope of the claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

The claims should not be read as limited to the described order or elements unless stated to that effect. It should be understood that various changes in form and detail may be made by one of ordinary skill in the art without departing from the spirit and scope of the appended claims. All implementations that come within the spirit and scope of the following claims and equivalents thereto are claimed.

What is claimed is:

1. A method of securely exchanging transaction data with a transaction data provider involving a first encryption algorithm, a second encryption algorithm, and a third encryption algorithm, the method comprising:
   receiving, by a content selection system, a first set of ciphertext transaction data pairs from the transaction data provider each comprising a first common identifier encrypted by the second encryption algorithm and a first transaction value encrypted by the third encryption algorithm;
   selecting the first encryption algorithm to be commutative with the second encryption algorithm;
   generating, by the content selection system, a set of second common identifiers by applying a first public key and the first encryption algorithm to each of the first common identifiers of the first set of ciphertext transaction data pairs such that each of the second common identifiers is double encrypted;
   generating, by the content selection system, a set of second transaction values by calculating a product of each of the first transaction values of the first set of ciphertext transaction data pairs and a respective encrypted offset, including generating the respective encrypted offset for each of the second transaction values by applying a third public key and the third encryption algorithm to a respective randomized offset value;
   generating, by the content selection system, a second set of ciphertext transaction data pairs each comprising a respective common identifier of the set of second common identifiers and a respective transaction value of the set of second transaction values;
   transmitting, by the content selection system, the second set of ciphertext transaction data pairs and a request to the transaction data provider, wherein the request comprises a third set of ciphertext common identifiers that is a subset of the second common identifiers of the second set of ciphertext transaction data pairs, and wherein each identifier of the third set of ciphertext common identifiers is encrypted by the first encryption algorithm;
   receiving, by the content selection system, a third set of transaction values, wherein each transaction value of the third set of transaction values corresponds to a respective common identifier of the third set of ciphertext common identifiers and has been decrypted by the transaction data provider using a first private key prior to being received by the content selection system; and
   subtracting, by the content selection system, the respective randomized offset value from the transaction value for each transaction value of the third set of transaction values in order to calculate an aggregate transaction value;
   wherein the use of the first encryption algorithm, second encryption algorithm, and third encryption algorithm allows the content selection system and the transaction data provider to access some portions of the data transmitted between the content selection system and the transaction data provider to facilitate determination of the aggregate transaction value while preventing access to other portions of the data.

2. The method of claim 1, wherein the first and second encryption algorithms are Diffie-Hellman encryption algorithms.

3. The method of claim 1, wherein the third encryption algorithm is an additive homomorphic encryption algorithm.

4. The method of claim 3 wherein the third encryption algorithm is Paillier encryption algorithm.

5. The method of claim 1, wherein the first set of transaction data pairs includes transactions that occurred during a predetermined period of time.

6. The method of claim 1, wherein each of the first common identifiers is associated with a respective user that selected a content item associated with the content selection system.

7. The method of claim 1, wherein the first common identifier is associated with a user that viewed a content item associated with the content selection system.

8. A content selection system comprising:
one or more data processors; and one or more storage devices storing instructions that, when executed by the one or more data processors, cause the one or more data processors to perform operations comprising:
receiving a first set of ciphertext transaction data pairs from a transaction data provider each comprising a first common identifier encrypted by the second encryption algorithm and a first transaction value encrypted by the third encryption algorithm;
selecting the first encryption algorithm to be commutative with the second encryption algorithm;
generating a set of second common identifiers by applying a first public key and the first encryption algorithm to each of the first common identifiers of the first set of ciphertext transaction data pairs such that each of the second common identifiers is double encrypted;
generating a set of second transaction values by calculating a product of each of the first transaction values of the first set of ciphertext transaction data pairs and a respective encrypted offset, including generating the respective encrypted offset for each of the second transaction values by applying a third public key and the third encryption algorithm to a respective randomized offset value;
generating a second set of ciphertext transaction data pairs each comprising a respective common identifier of the set of second common identifiers and a respective transaction value of the set of second transaction values;
transmitting the second set of ciphertext transaction data pairs and a request to the transaction data provider, wherein the request comprises a third set of ciphertext common identifiers that is a subset of the second common identifiers of the second set of ciphertext transaction data pairs, and wherein each identifier of the third set of ciphertext common identifiers is encrypted by the first encryption algorithm;
receiving a third set of transaction values, wherein each transaction value of the third set of transaction values corresponds to a respective common identifier of the third set of ciphertext common identifiers and has been decrypted by the transaction data provider using a first private key prior to being received by the content selection system; and
subtracting the respective randomized offset value from the transaction value for each transaction value of the third set of transaction values in order to calculate an aggregate transaction value;
wherein the use of the first encryption algorithm, second encryption algorithm, and third encryption algorithm allows the content selection system and the transaction data provider to access some portions of the data transmitted between the content selection system and the transaction data provider to facilitate determination of the aggregate transaction value while preventing access to other portions of the data.

9. The system of claim 8, wherein the third encryption algorithm is an additive homomorphic encryption algorithm.

10. A computer-readable storage device storing instructions that, when executed by one or more data processors, cause the one or more data processors to perform operations allowing the device to securely exchange transaction data with a transaction data provider using a first encryption algorithm, a second encryption algorithm, and a third encryption algorithm, the operations comprising:
accessing a first set of ciphertext transaction data pairs each comprising a first common identifier encrypted by the second encryption algorithm and a first transaction value encrypted by the third encryption algorithm;
selecting the first encryption algorithm to be commutative with the second encryption algorithm;
generating a set of second common identifiers by applying a first public key and the first encryption algorithm to each of the first common identifiers of the first set of ciphertext transaction data pairs such that each of the second common identifiers is double encrypted; and
generating a set of second transaction values by calculating a product of each of the first transaction values of the first set of ciphertext transaction data pairs and a respective encrypted offset, including generating the respective encrypted offset for each of the second transaction values by applying a third public key and the third encryption algorithm to a randomized offset value;
generating a second set of ciphertext transaction data pairs each comprising a respective common identifier of the set of second common identifiers and a respective transaction value of the set of second transaction values;
transmitting the second set of ciphertext transaction data pairs and a request to a transaction data provider, wherein the request comprises a third set of ciphertext common identifiers that is a subset of the second common identifiers of the second set of ciphertext transaction data pairs, and wherein each identifier of the third set of ciphertext common identifiers is encrypted by the first encryption algorithm;
accessing a third set of transaction values, wherein each transaction value of the third set of transaction values corresponds to a respective common identifier of the third set of ciphertext common identifiers and has been decrypted by the transaction data provider using a first private key prior to being received by the content selection system; and
subtracting the respective randomized offset value from the transaction value for each transaction value of the third set of transaction values in order to calculate an aggregate transaction value;
wherein the use of the first encryption algorithm, second encryption algorithm, and third encryption algorithm allows the content selection system and the transaction data provider to access some portions of the data transmitted between the content selection system and the transaction data provider to facilitate determination of the aggregate transaction value while preventing access to other portions of the data.

11. The computer-readable storage device of claim 10, wherein the third encryption algorithm is an additive homomorphic encryption algorithm.

12. The computer-readable storage device of claim 10, wherein only the transaction data provider has access to the first private key.

* * * * *